INVENTOR
James M. Lapeyre

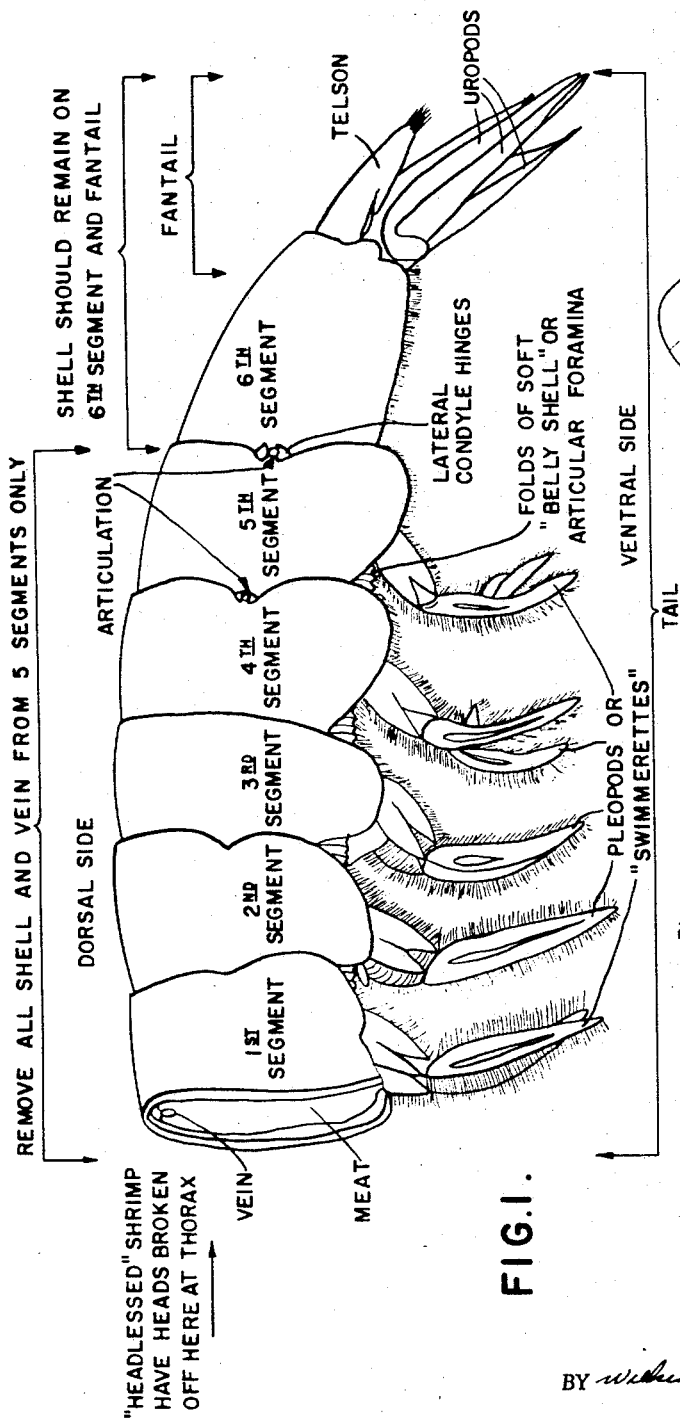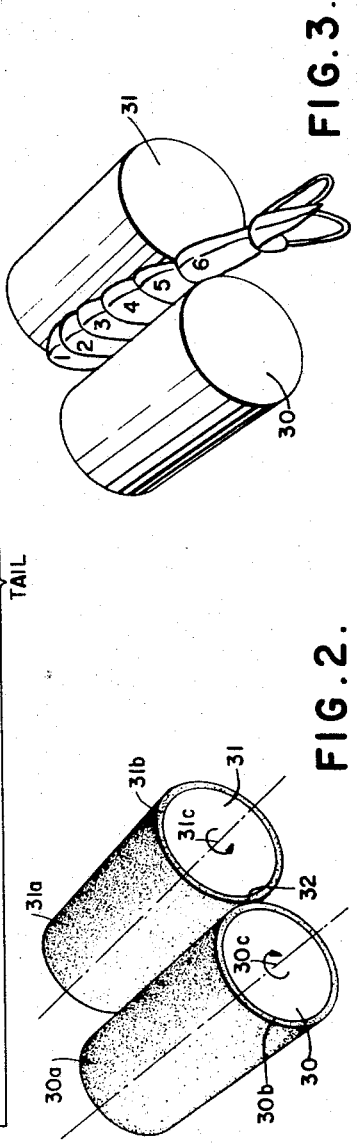

BY
ATTORNEYS

March 4, 1969 J. M. LAPEYRE 3,430,288
APPARATUS FOR INDIVIDUALLY TREATING HEADLESS SHRIMP
Original Filed May 25, 1965 Sheet 3 of 3

INVENTOR
James M. Lapeyre

BY *Wilkinson, Mawhinney & Theibault*

ATTORNEYS

United States Patent Office 3,430,288
Patented Mar. 4, 1969

3,430,288
APPARATUS FOR INDIVIDUALLY TREATING
HEADLESS SHRIMP
James M. Lapeyre, New Orleans, La., assignor to The
Laitram Corporation, New Orleans, La., a corporation of Louisiana
Original application May 25, 1965, Ser. No. 458,645, now
Patent No. 3,324,504, dated June 13, 1967. Divided
and this application Sept. 9, 1966, Ser. No. 592,241
U.S. Cl. 17—2                    12 Claims
Int. Cl. A22c 29/00

ABSTRACT OF THE DISCLOSURE

The invention is directed to an apparatus for treating de-headed and dorsally cut shrimp for the fantail market which apparatus is provided with laterally adjacent rotary peeling surfaces defining a peeling nip between the convergent surfaces. The surfaces and nip are of sufficient length to receive the first 5 abdominal segments of a shrimp so that the 6th segment projects partially beyond the peeling surfaces and is free of effective peeling contact therewith. A means is provided for activating the peeling surfaces and nip to act upon the dorsally cut segments 1 through 5 so that the latter shell segments are removed substantially normal to the axis of the shrimp meat leaving the abdominal shell segment 6 with its connecting uropods and telson substantially intact and attached to the de-shelled shrimp meat.

---

This application is a division of my copending application, Ser. No. 458,645, filed May 25, 1965, U.S. Patent 3,324,504 granted June 13, 1967.

Fantail or butterfly shrimp is a commercial form in which the first five abdominal segments of the shell of a headless shrimp are removed to expose the meat while the 6th abdominal segment is unaffected and remains in place in its original, natural condition along with the uropods and telson which together form the tail section having a generally fan formation.

The invention has for an object certain novel steps of the process and in a novel apparatus by which shrimp of this type are economically and quickly produced in a clean-cut operation in which the integrity of the meat is preserved.

Another object of the invention is to provide a novel process and apparatus for producing so-called fantail or butterfly shrimp in which meat exposed by the de-shelled segments is spread to a flattened condition more suitable for breading, handling and consumption.

A further object of the invention is to provide a novel process and apparatus by which fantail or butterfly shrimp may be produced in a single-placement operation whereby previously de-headed shrimp are immobilized to an initially de-activated peeling machine which serves as a cradle for the shrimp, in which any or all steps of the process may be performed such as breaking or disjointing the lateral condyle hinges between the 5th and 6th abdominal segments to facilitate the later peeling of the 5th segment independently of the 6th such abdominal segment, and in which placement an incising or slitting operation may be performed on the dorsal side of the shrimp to and through the first five abdominal segments, omitting the 6th segment and leaving the latter substantially intact, and in which placement the severed half or partial sections of the incised segment may be finally peeled or pulled from the body by activation of the peeling machine.

Other objects are to simplify the mechanical detail and the steps of the process and to promote economy in the production of fantail or butterfly shrimp.

With the foregoing and other objects in view, the invention will be more fully described hereinafter, and will be more particularly pointed out in the claims appended hereto.

In the drawings, wherein like symbols refer to like or corresponding parts throughout the several views:

FIGURE 1 is a schematic of a de-headed shrimp with applicable terminology applied thereto showing the raw product on which the improved process and apparatus operate.

FIGURE 2 is a fragmentary perspective view showing a form of a piece of apparatus on which at least one step of the improved process is carried out.

FIGURE 3 is a similar view showing a headless shrimp cradled in the crotch of the rollers which are indicated as slightly modified over the rollers of FIGURE 2.

Figure 4:
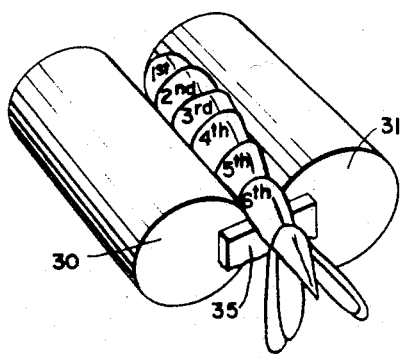
FIGURE 4 is a fragmentary perspective view showing the introduction of an anvil on which the 6th abdominal segment of the shrimp is made to rest incident to a subsequent step of the process.

Referring more particularly to the drawings and initially to FIGURE 1 which illustrates the essential morphology of the shrimp, particularly the white shrimp (*Penaeus setiferus*) which is more particularly illustrated on pages 4, 5, 6 and 104 of Fishery Bulletin 145 by Joseph H. Young, from Fishery Bulletin of the Fish and Wildlife Service, Vol. 59, United States Department of the Interior.

FIGURE 1 illustrates a headless or de-headed shrimp showing that the body section containing the edible meat is enclosed in abdominal segments numbered 1 to 6 inclusive, the 6th segment being directly connected to the uropods and the telson: such 6th segment being connected wtih the 5th segment by the lateral condyle hinges which provide the articulation between these segments by which the shrimp is enabled to assume the curled condition typical of the specie.

A detail of this articulation is shown more clearly on p. 104 of the publication referred to. While there is a similar articulation between the 4th and 5th segments it does not possess the strength of the hinges between the 5th and 6th segments and as the 5th segment along with segments 1, 2, 3 and 4, is to be incised and removed revealing the body meat, the invention is not concerned with the articulation between the 4th and 5th segments but only with the hinges between the 5th and 6th segments, as the latter are preferably to be disjoined, pulled out or broken advantageously before slitting the dorsal side of the shrimp as otherwise an undisturbed articulation at this point may become troublesome in securing full and clean removal of the 5th segment and may cause tearing of the meat or other multilation resulting in downgrading of the meat in the market.

This FIGURE 1 also shows the position of the sand vein which must be removed to avoid its adverse deteriorating effect on the meat.

FIGURE 1 also shows some of the appendages which project from the ventral side of the shrimp. These appendages are useful in the de-shelling operation, particularly where roller peeling is employed. It is to be noted that the 6th segment contains very little, if any, appendages so that even if it is subjected to the crotch of peeling rollers there is reduced tendency to draw the uncut shell into the nip of the rollers.

As indicated also in FIGURE 1, it is a purpose of the invention to remove the shell of the first five segments along with the appendages and with the sand vein, and for this purpose the dorsal sides of the first five segments are slit or incised longitudinally, preferably in alignment with the tunnel in the meat containing the sand vein so that the sand vein may be removed possibly even in one operation with the incision or slitting step, which latter is generally omitted from the 6th segment, leaving the shell of this segment all around substantially unaffected and intact.

FIGURE 2 shows frictional peeling members in their simplest form, namely, rollers 30 and 31 rotatable about axes 30$^c$ and 31$^c$. The rollers are spaced apart slightly so that the shells which are removed from abdominal segments 1, 2, 3, 4 and 5 of the shrimp are able to pass through the gap or nip 32 between the rollers to the underside of the same, where they may be washed away by water or other fluid.

If the rollers 30 and 31 are provided with deformable, for instance, rubber, coverings 30$^b$ and 31$^b$ it will not be necessary to space them apart since the rubber covers will deform sufficiently to allow passage of the shells.

The rollers, so associated, present convex or arcuate confronting surface 30$^a$ and 31$^a$ outwardly or upwardly of the nip 32 and together with the nip these surfaces form a cradle for receiving and supporting the shrimp providing a single-emplacement for the shrimp throughout all steps of the process.

FIGURE 3 shows the shell-on shrimp nested in the cradle between the confronting curvilinear surface 30$^a$ and 31$^a$ of the rollers with its ventral side facing the nip 32 between said rollers. The placement of the shrimp is such that abdominal segment 6 is at least partially overhanging the ends of the rollers and the uropods and telson are wholly outside the cradle and forwardly of the ends of the rollers.

FIGURE 4 also shows the shell-on shrimp in place in the cradle with the ventral side facing the nip between the rollers 30 and 31 and abdominal segment 6 overhanging and supported by an anvil or tail support 35. The purpose of the anvil or tail support is twofold: in the first place to prevent abdominal segment 6 from being drawn into the nip between the rollers which would result in multilation or complete breaking off of the shrimp tail, and in the second place the part 35 provides a fulcrum over which the tail section, which is comprised of abdominal segment 6 with connecting telson and uropods, may be forcibly bent in order to effect breaking of the lateral condyle hinges which provide the articulation between abdominal segments 5 and 6.

Figure 5:
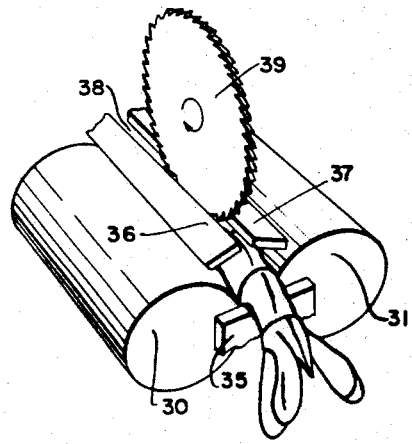
FIGURE 5 is a further fragmentary perspective view illustrating the application of a slotted retaining member to the shrimp occupying the crotch with a rotary saw in the act of incising the dorsal side of the shrimp.

In FIGURE 5 the shell-on shrimp still reposes in the cradle between the rollers 30 and 31 with the ventral side facing the nip between the rollers. The same is forcibly held in this position or in other words immobilized by the retaining members of bars 36, 37 which are spaced apart to provide a blade passage or slot 38 for the blade or slitting tool which in this figure is shown to be a rotary saw 39 positioned to traverse the upper dorsal side of the shrimp in a longitudinal direction.

This incising or ripping tool may be moved along the slot 38 the distance of abdominal shell segments 1 to 5 inclusive. The tool will cut through these shell segments longitudinal alignment with the tunnel in the meat occupied by the black vein and in a certain percentage of cases will rip out the black vein and also penetrate a suitable distance into the meat below the vein to facilitate spreading and flattening of the meat in cases where this is desired.

Figure 6:
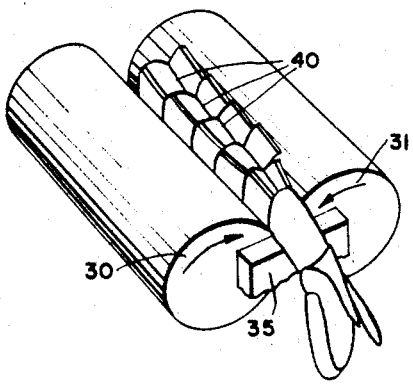
FIGURE 6 is a fragmentary perspective view illustrating the rollers or curvilinear surfaces as put in motion and the de-shelling step begun or in progress.

FIGURE 6 shows the condition of the shrimp after the tool 39 and the retaining members 36, 37 have been removed and the rollers 30 and 31 put into rotary movement. The frictional surfaces of the sand-blasted metal or other rollers are engaging the lateral portions or halves of the incised segments 1 to 5 and shifting the same toward the nip 32 through which the shell sections are pulled from the meat. The slippery nature of the meat and the pinching or squeezing action of the rollers tends to reject the meat upwardly and in the event that the incision has penetrated from the tunnel into the meat, as indicated at 40 in FIGURE 6, the meat will have a tendency to spread out in the progressively widening area outwardly of the nip 32 by reason of the arcuate or curvilinear surfaces 30$^a$ and 31$^a$.

Figure 7:
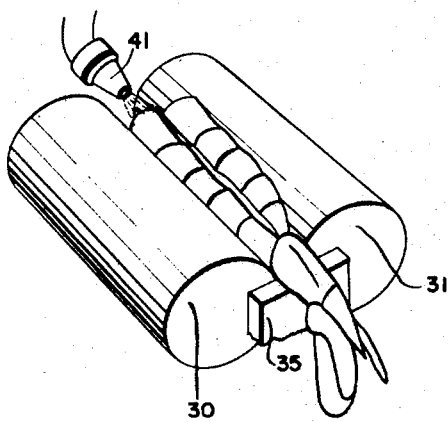
FIGURE 7 is a fragmentary perspective view showing the de-shelling operation as substantially completed with the application of pressure fluid for removing the shrimp from the cradle after the completion of all operations.

FIGURE 7 shows a further step of the process in which all of the shell segments 1, 2, 3, 4 and 5 have been removed from the meat and a water or other jet is directed into the cradle space at the rear end thereof by which the completely treated shrimp is forced or ejected from its position between the rollers in a forward direction.

Figure 8:
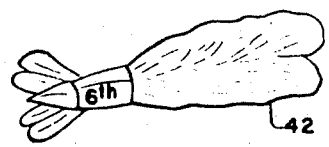
FIGURE 8 is a perspective view on a reduced scale of the fantail or butterfly shrimp product by the improved process and machine in which the 6th abdominal shell segment, the uropods and telson remain unaffected and intact and the body meat attached thereto and in a substantially flattened condition ready for frying, breading or other cooking procedures.

FIGURE 8 illustrates the end product, being a completed fantail shrimp 42 where all shell has been removed except for abdominal segment 6 with the connecting telson and uropods.

Figure 9:
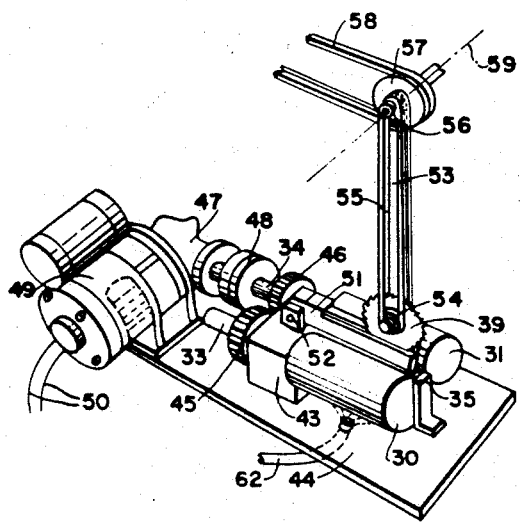
FIGURE 9 is a perspective view of a form of machine for driving the rollers or curvilinear surfaces and for operating the circular incising or slitting saw.

Referring more particularly to FIGURE 9, the rollers 30 and 31 being short, do not require any support at their forward ends but the shafts 33 and 34 thereof are or may be journaled in bearings in a mounting block 43 installed on a suitable base or bed 44. The shafts 33 and 34 may be geared together by intermeshing pinions 45 and 46 to insure rotation of the rollers in relatively opposite directions.

The shafts may be driven in any suitable manner by suitable power source. For instance, one of the shafts 34 is shown in FIGURE 9 as coupled to the output shaft of a motorized speed reducer 47 by a coupling 48, the reducer being driven by an electric or other motor 49 connected to an appropriate power and control source through wires 50. The pinion 46 transmits rotary motion, although in an opposite sense, to pinion 45 causing the rollers to rotate in relatively opposite directions as heretofore explained.

Figure 11:
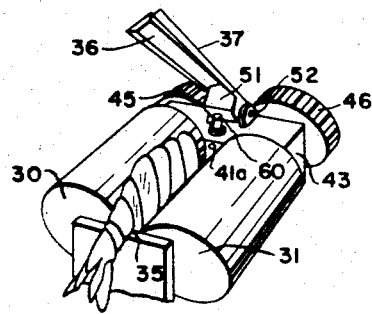
FIGURE 11 is also a fragmentary perspective view showing the retaining member in the raised position to permit the placement of a shrimp in the roller cradle with the 6th abdominal section draped over the end.

The shrimp immobilizing and retaining bars 36 and 37 may be connected together by a yoke 51 pivoted at 52 to an upstanding member on the block 43 in an orientation in which the immobilizing or retaining member may hinge or pivot about a substantially horizontal transverse axis so as to permit the immobilizing and retaining member to swing upwardly to the position of FIGURE 11 to permit the placement of shrimp in the cradle.

The blade or saw 39 is mounted for rotation on an arm 53 and may be driven through a pulley 54 from a belt 55, which in turn is driven by a pulley 56 receiving rotation from an associated pulley 57 which is driven from belt 58 from an appropate power source. The arm 53 swings about an axis 59 so that the blade or saw 39 may be forced to traverse the length of the slot 38 between the retaining members 36 and 37. The anvil is indicated at 35.

Figure 10:
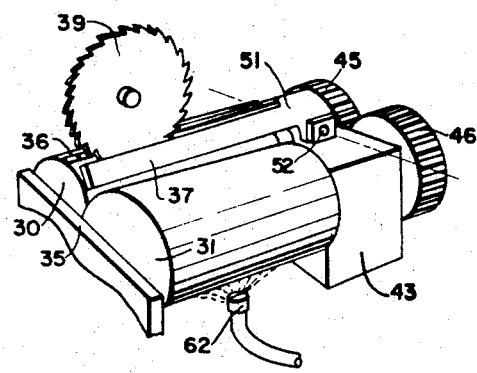
FIGURE 10 is a fragmentary perspective view showing more clearly the entry of the circular rotary saw through a slot in the retaining member.

FIGURE 10 is an enlarged perspective view showing the rollers 30 and 31, the mounting block 43, the pinions 45 and 46 and the pivotal connection 52 for the retaining bars 36 annd 37 which are yoked together at 51.

FIGURE 11 is also an enlarged perspective view showing the shrimp nested between the rollers 30 and 31 with the ventral side facing downwardly. In this instance the shrimp retaining members or bars 36 and 37 are shown in raised position about the pivotal axis 52. A reciprocating push rod 60 is shown as extending up through the mounting block 43 to engage the underside of the yoke 51 in a lifting action as hereinafter explained.

A jet orifice 41ª in connection with a source of liquid under appropriate pressure may be mounted through the block 43 aimed at the shrimp so as to eject the shrimp from the cradle on completion of all process steps.

Figure 12:
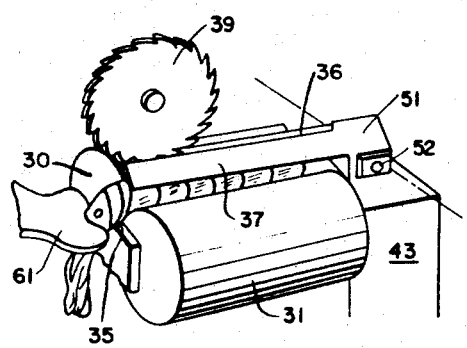
FIGURE 12 is also a fragmentary perspective view showing the subsequent lowering of the retaining member, the completion of the slitting operation by the saw and the breaking of the lateral condyle hinges between the 5th and 6th abdominal segments of the shrimp.

Referring more particularly to FIGURE 12, a thrust member 61, manually or mechanically actuated, is positioned to apply bending force to the tail section so as to break the lateral condyle hinge joint between abdominal segments 5 and 6. The retaining members 36, 37 will hold the shrimp down against any tendency of the shrimp to rise or lift incident to the application of force through the member 61 to achieve this breaking of the hinges. The first five abdominal segments will be held against any movement by the bars or members 36, 37 throughout the joint breaking operation. The 6th abdominal segment, however, will be free to rock about the fulcrum 35, thus enabling the tail portion to be bent down, in which position it is removed from the plane of cut so that the blade or saw 39 rotating about its axis may cut the abdominal segments 1, 2, 3, 4 and 5 without cutting abdominal segment 6. The cutting of segments 1 through 5 without any cutting of segment 6 is desirable with the articulation breaking method herein employed.

Under the provisions of Patent Rule 79, this application while disclosing the subject matter of the specific form of breaking the articulation between the 5th and 6th abdominal shell segments is not claimed herein for the reason that it is not applicant's invention but the invention of one Fernand S. Lapeyre, whose independent application therefor has matured into U.S. Patent No. 3,331,097, granted July 18, 1967, both applications being owned by the common assignee, The Laitram Corporation. Consequently, as a part of the process and apparatus forming the invention herein, the step or means of breaking this articulation is only claimed broadly.

In case of a different articulation breaking method, such as that shown in the Ambos Patent No. 3,164,859, granted Jan. 12, 1965, it would be permissible to have the blade cut to some extent into abdominal segment 6 since removal of this segment is precluded by the presence of the anvil 35.

So far is roller surfaces are concerned, it is preferred to use either a rubber covered roller or a roller of stainless steel having a very finely sandblasted surface. Both such surfaces supply sufficient friction to peelingly engage the incised shrimp shell sections of the abdominal segments and move same to and through the peeling nip, while such rollers are completely harmless to the slippery shrimp meat once the shell has been removed and will not grip the shrimp meat in any manner to injure the same.

In FIGURES 9 and 10, a water line and nozzle 62 are shown for cleaning the rollers.

What is claimed is:

1. An apparatus for treating de-headed and dorsally cut shrimp for the so-called fantail market comprising
   (a) laterally adjacent rotary peeling means having
   (b) peeling surfaces,
   (c) a peeling nip to which the surfaces are convergent,
   (d) said surfaces and nip being at least sufficiently long to receive abdominal segments 1, 2, 3, 4 and 5 of the shrimp with segment 6 projecting at least partially therebeyond so as to be substantially free of effective peeling contact with the convergent peeling surfaces, and
   (e) means for activating the peeling surfaces and peeling nip to act upon the dorsally cut shell segments 1, 2, 3, 4 and 5 so that the latter shell segments are removed substantially normal to the axis of the shrimp meat, leaving abdominal shell segment 6 with its connecting uropods and telson substantially intact and attached to the de-shalled shrimp meat.

2. An apparatus as claimed in claim 1 in which the peeling surfaces are
   (f) curvilinear and
   (g) rotary, and said activating means includes
   (h) said means for activating the peeling surfaces generating rotary motion in the peeling surfaces mutually toward the peeling nip.

3. An apparatus as claimed in claim 1, further comprising
   (f) means for substantially immobilizing the abdominal segments 1, 2, 3, 4 and 5 relative to the peeling surfaces while such surfaces are inactive.

4. An apparatus as claimed in claim 1, further comprising
   (f) means beyond an end of the peeling surfaces for at least partially supporting the 6th abdominal segment.

5. An apparatus as claimed in claim 1, further comprising
   (f) means beyond an end of the nip for receiving the 6th abdominal segment and supporting the same at an inclination to the long axis of the shrimp.

6. An apparatus as claimed in claim 1, further comprising
   (f) means for breaking the articulation between shell segments 5 and 6.

7. An apparatus for the treatment of de-headed dorsally cut shrimp for the so-called fantail commercial market, comprising
   (a) side-by-side adjacently disposed peeling rollers, the axis of which lie in a non-vertical plane associated to form
   (b) a peeling nip therebetween,
   (c) a cradle outwardly of the nip for the support of abdominal segments 1, 2, 3, 4 and 5 of the shrimp,
   (d) support means adjacent the cradle for at least the partial support of abdominal segment 6, and
   (e) means for generating movement in the rollers in a peeling action for peeling the first five abdominal segments to the exclusion of shell segment 6 which is left intact with the uropods and telson but attached to the de-shalled meat.

8. Apparatus for treating de-headed shrimp comprising
   (a) initially non-rotating rotatable curvilinear supports convergent to a peeling nip into which shrimp may be successively placed with the ventral sides to the nip,
   (b) means associated with the supports for immobilizing the shrimp in this placement,
   (c) means also associated with the supports for dorsally incising the immobilized shrimp in said placement in a longitudinal direction through the first five abdominal segments, and
   (d) means for rotating the supports about their respective axes in relatively opposite directions toward and through the nip for stripping the severed sections of the shell segments through the nip while ejecting the shrimp meat substantially outward from the nip.

9. Apparatus for treating de-headed shrimp for fantail or butterfly production as claimed in claim 8, further comprising (e) means for disjointing the lateral condyle hinges between the 5th and the 6th abdominal shell segments.

10. Apparatus for treating de-headed shrimp for fantail or butterfly production as claimed in claim 8, further comprising
(e) means for lubricating and cleaning rotatable supports.

11. An apparatus for treating de-headed shrimp comprising
(a) a de-activated peeling machine into which the shrimp is delivered,
(b) a normally withdrawn immobilizing means,
(c) means for moving the immobilizing means against the shrimp for holding the same in the machine,
(d) means for slitting the shrimp along the dorsal side in this emplacement, and
(e) means for activating the peeling machine for performing a peeling operation.

12. Apparatus for treating de-headed shrimp for the production of fantail or butterfly shrimp comprising
(a) rollers associated together for rotation in relatively opposite directions with confronting portions moving together substantially downwardly to a substantially upright peeling nip into which shrimp are adapted to be individually and successively placed with the dorsal side upwardly so that the shrimp will gravitate to a position in which the lateral shell portions are contacted by the confronting surfaces of the rollers and the ventral side of the shrimp is presented to the peeling nip,
(b) means for controlling the rotary movement of the rollers,
(c) movable means associated with the rollers for slitting the shrimp longitudinally through the upper dorsal side including the 1st, 2nd, 3rd, 4th and 5th abdominal segments, which severed segments are drawn through the nip in a peeling operation when the rollers are put in rotation, and
(d) restraining means associated with said rollers for detachably engaging the dorsal side of a shrimp so placed for stabilizing the shrimp for the slitting operation.

References Cited

UNITED STATES PATENTS

| | | | |
|---|---|---|---|
| 2,716,776 | 9/1955 | Streich et al. | 17—2 |
| 2,974,356 | 3/1961 | Cerny | 17—2 |
| 3,247,542 | 4/1966 | Jonsson | 17—2 |
| 3,310,832 | 3/1967 | Ambos et al. | 17—2 |

LUCIE H. LAUDENSLAGER, *Primary Examiner.*